US012764473B2

(12) United States Patent
Xiang et al.

(10) Patent No.: US 12,764,473 B2
(45) Date of Patent: Oct. 13, 2026

(54) SPEAKER

(71) Applicant: AAC Microtech (Changzhou) Co., Ltd., Changzhou (CN)

(72) Inventors: Qun Xiang, Changzhou (CN); Xiaodong Liu, Changzhou (CN); Shuai Li, Changzhou (CN); Xiaojun Song, Changzhou (CN); Chao Zhang, Changzhou (CN); Yu Qi, Changzhou (CN); Yang Shi, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 174 days.

(21) Appl. No.: 18/645,418

(22) Filed: Apr. 25, 2024

(65) Prior Publication Data

US 2025/0184668 A1 Jun. 5, 2025

Related U.S. Application Data

(63) Continuation of application No. PCT/CN2023/136265, filed on Dec. 4, 2023.

(51) Int. Cl.

| | |
|---|---|
| ***H04R 9/06*** | (2006.01) |
| ***H04R 1/02*** | (2006.01) |
| ***H04R 7/12*** | (2006.01) |
| ***H04R 7/18*** | (2006.01) |
| ***H04R 9/02*** | (2006.01) |

(52) U.S. Cl.

CPC ............... *H04R 9/06* (2013.01); *H04R 1/023* (2013.01); *H04R 7/127* (2013.01); *H04R 7/18* (2013.01); *H04R 9/025* (2013.01); *H04R 9/022* (2013.01); *H04R 2400/11* (2013.01)

(58) Field of Classification Search

CPC .......... H04R 9/022; H04R 9/025; H04R 7/18; H04R 7/127; H04R 2400/11

See application file for complete search history.

(56) References Cited

U.S. PATENT DOCUMENTS

2017/0134862 A1* 5/2017 Ma ......................... H04R 9/025

* cited by examiner

*Primary Examiner* — Sunita Joshi

(74) *Attorney, Agent, or Firm* — Wersch Law Group

(57) ABSTRACT

A speaker includes a frame, a vibration system and a magnetic circuit system fixed with the frame, the magnetic circuit system includes a lower clamping plate, a main magnet fixed with an upper surface of the lower clamping plate, an annular secondary magnet surrounding the main magnet for forming a magnetic gap, the lower clamping plate includes a lower surface opposite to the upper surface and a leakage channel recessed from the upper surface to the lower surface but not penetrating the lower surface, the leakage channel connects to the magnetic gap and an outside of the annular secondary magnet. The present invention provides a thinner and more efficient sounding device. The present invention could effectively balance the sound pressure inside and outside the speaker and improve the acoustic performance of the speaker.

6 Claims, 3 Drawing Sheets

100

A-A

SPEAKER

TECHNICAL FIELD

The present invention belongs to the technical field of electronic devices, and in particular, to a speaker.

BACKGROUND

With the development of the science and technology, portable electronic products, such as cell phones, handheld game consoles, navigation devices or handheld multimedia entertainment devices in people's daily life in a wide range of applications, and in these mobile electronic devices, the voice playback device is an indispensable part of the internal, the voice quality of the high and low directly affects the user experience of the user to use these mobile electronic devices, therefore the requirements for the speaker used in these devices are getting higher and higher.

In the related technology, the speaker includes a vibration system and a magnetic circuit system, the vibration system includes a voice coil, and the magnetic circuit system includes a lower clamping plate, a main magnet fixed to the lower clamping plate, and a ring-shaped sub-magnet is provided around the main magnet to form a magnetic gap, and generally, the ring-shaped sub-magnet will result in the air under the voice coil not being able to effectively leak, thereby affecting the heat dissipation of the voice coil, and moreover, adversely affecting the acoustic performance of the speaker.

Therefore, there is a need to provide a new speaker to solve the above problem.

SUMMARY

The present invention is intended to provide a speaker to solve one of the technical problems existing in the prior art.

The present invention provides a speaker including a frame, a vibration system and a magnetic circuit system fixed with the frame, the magnetic circuit system includes a lower clamping plate, a main magnet fixed with an upper surface of the lower clamping plate, an annular secondary magnet surrounding the main magnet for forming a magnetic gap, the lower clamping plate includes a lower surface opposite to the upper surface and a leakage channel recessed from the upper surface to the lower surface but not penetrating the lower surface, the leakage channel connects to the magnetic gap and an outside of the annular secondary magnet.

As an improvement, the lower clamping plate includes two first long sides opposite to each other, two second long sides perpendicular to the two first long sides, and two curved corner portions connecting each of the two first long sides to each of the second long sides, the leakage channel is located in at least one of the two curved corner portions, the two first long sides, the two second long sides.

As an improvement, the vibration system includes a diaphragm fixed with the frame, an elastic support member opposite to the diaphragm, and a voice coil which drives the diaphragm to vibrate to produce sound, the diaphragm includes a dome and a suspension surrounding the dome, the dome includes a main body portion and an extension portion bending and extending from an edge of the main body portion towards to the magnetic circuit system, the elastic support member is fixed between the extension portion and the frame, the voice coil is fixed with the main body portion.

As an improvement, the suspension includes a bending portion, an inner fixing portion extending from an inner side of the bending portion, and an outer fixing portion extending from an outer side of the bending portion, the inner fixing portion is fixed with the main body portion, the outer fixing portion is fixed with the frame and provided on three surfaces of the frame.

As an improvement, the suspension, the dome, and the frame are integrally formed.

As an improvement, the magnetic circuit system further includes a main pole plate and an annular secondary pole plate attached to the main magnet and the annular secondary magnet respectively, the elastic support member includes a first portion extending from an inner side of the extension portion and a second portion extending from the first portion in a direction away from the extension portion, the second portion is fixed with the main body portion, the annular secondary pole plate is provided with an avoidance portion to avoid the second portion at a position opposite to the second portion.

As an improvement, the speaker further includes a mesh which includes a fixed portion fixed with an edge of the lower clamping plate and a side wall bending and extending from the fixed portion towards the vibration system, an end of the side wall is fixed with a lower surface of the frame.

DESCRIPTION OF EMBODIMENTS

Figure 1:
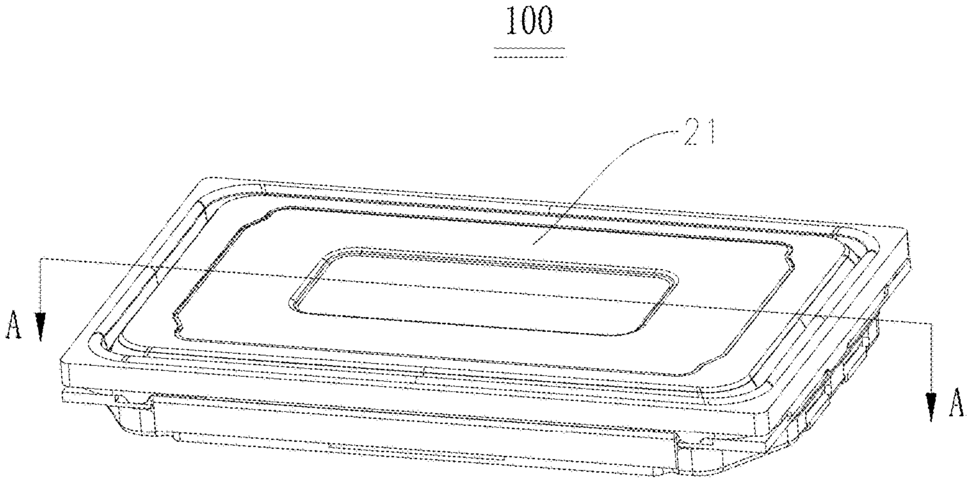
FIG. 1 is an isometric view of a speaker according to an embodiment of the present invention.

In order to enable those skilled in the art to better understand the technical solutions of the present invention, the present invention will be described in further detail below in conjunction with the accompanying drawings and specific embodiments. Obviously, the described embodiments are some, but not all, of the embodiments of the present invention. Based on the described embodiments of the present invention, all other embodiments obtained by those of ordinary skill in the art without creative efforts fall within the protection scope of the present invention.

As shown in FIG. 1 to FIG. 5, a speaker 100 includes a frame 1, and a vibration system 2 and a magnetic circuit 3 system fixed with the frame 1.

The vibration system 2 includes a diaphragm 21 fixed with the frame 1, an elastic support member 22 opposite to the diaphragm 21, and a voice coil 23 which drives the diaphragm 21 to vibrate to produce sound, the diaphragm 21 includes a dome 211 and a suspension 212 surrounding the dome 211, the dome 211 includes a main body portion 211*a* and an extension portion 211*b* bending and extending from an edge of the main body portion 211*a* towards to the magnetic circuit system 3, the elastic support member 22 is fixed between the extension portion 211*b* and the frame 1, the voice coil 23 is fixed with the main body portion 211*a*. When energized, the voice coil 23 will drive the diaphragm 21 to vibrate up and down under the action of the magnetic circuit system 3.

The suspension 212 includes a bending portion 212*a*, an inner fixing portion 212*b* extending from an inner side of the bending portion 212*a*, and an outer fixing portion 212*c* extending from an outer side of the bending portion 212*a*, the inner fixing portion 212*b* is fixed with the main body portion 211*a*, the outer fixing portion 212*c* is fixed with the frame 1 and provided on three surfaces of the frame 1.

In addition, the suspension 212, the dome 211, and the frame 1 are integrally formed.

The magnetic circuit system 3 includes a lower clamping plate 31, a main magnet 32 fixed to an upper surface 311 of the lower clamping plate 31, an annular secondary magnet 33 surrounding the main magnet 32 for forming a magnetic gap, the lower clamping plate 31 incudes a lower surface 312 opposite to the upper surface 311 and a leakage channel 31*a* recessed from the upper surface 311 to the lower surface 312 but not penetrating the lower surface 312, the leakage channel 31*a* connects to the magnetic gap and an outside of the annular secondary magnet 33. The leakage channel 31*a* not only effectively balances the sound pressure inside and outside the speaker to improve the acoustic performance of the speaker, but also facilitates the heat dissipation of the voice coil 23.

The lower clamping plate 31 includes two first long sides 313 opposite to each other, two second long sides 314 perpendicular to the two first long sides 313, and two curved corners 314 portion connecting each of the two first long sides 313 to each of the second long sides 315, the leakage channel 31*a* is located in at least one of the curved corner portions 315, the two first long sides 313, the two second long sides 314.

Figure 2:
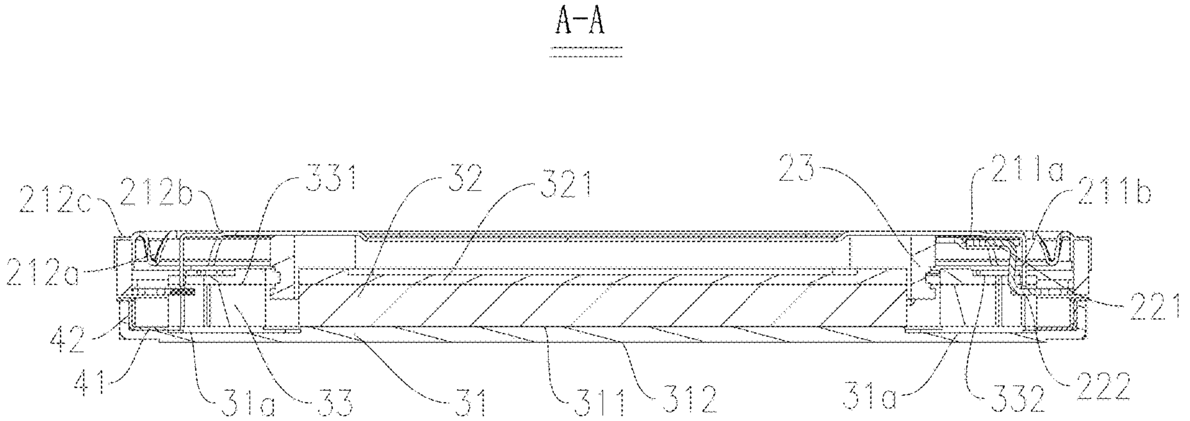
FIG. 2 is a schematic sectional view taken along a profile A-A in FIG. 1 according to the embodiment of the present invention.
Figure 3:
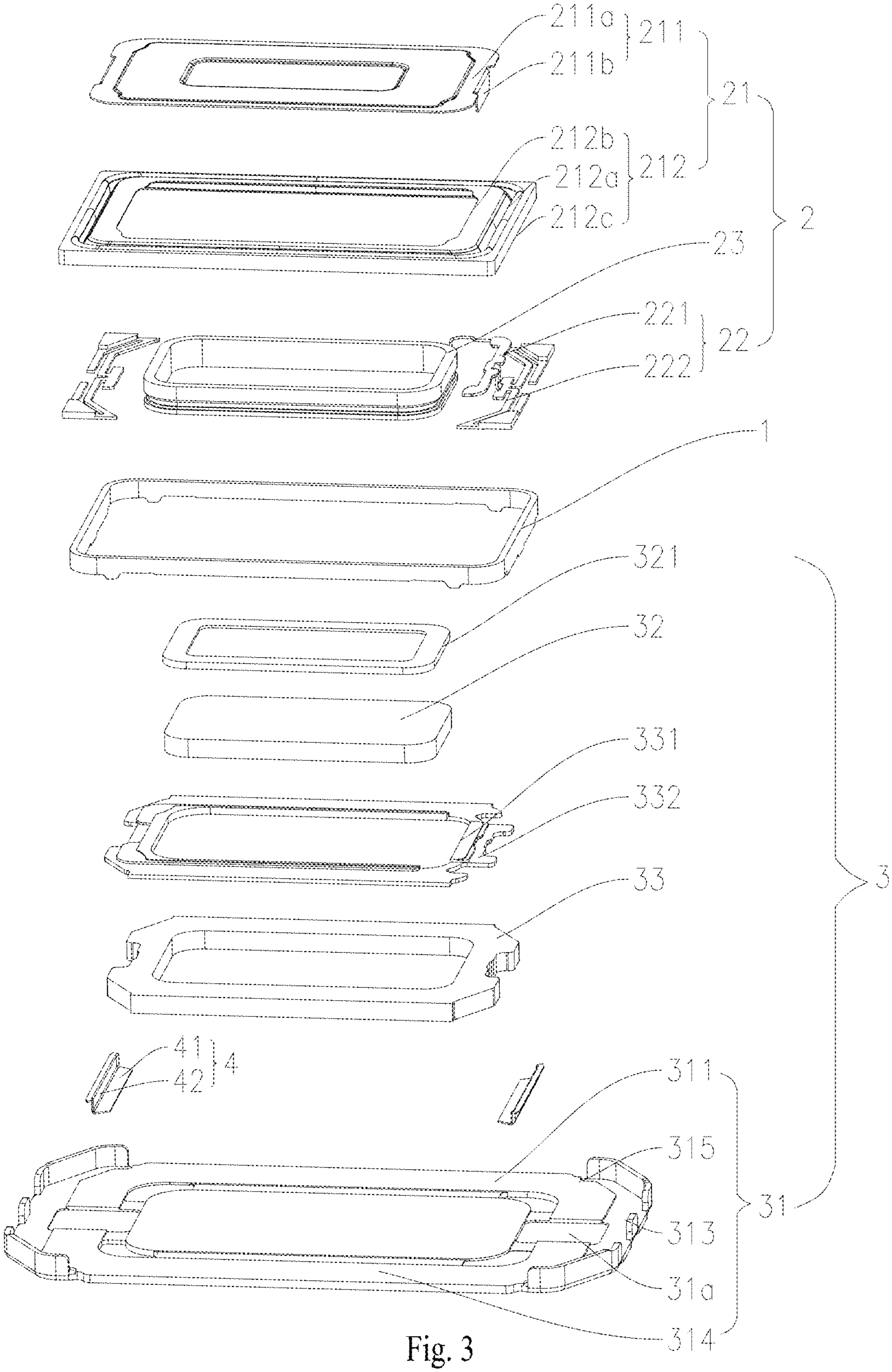
FIG. 3 is an exploded view of the speaker according to the embodiment of the present invention.
Figure 4:
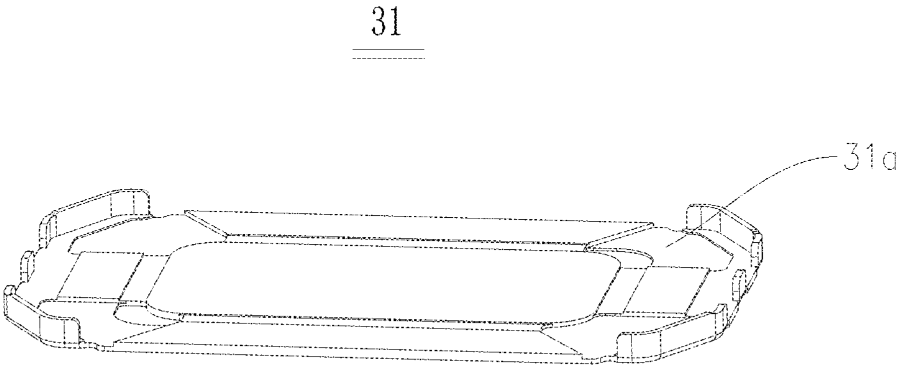
FIG. 4 is an isometric view of a leakage channel provided on a curved portion of a lower clamping plate according to the embodiment of the present invention.
Figure 5:
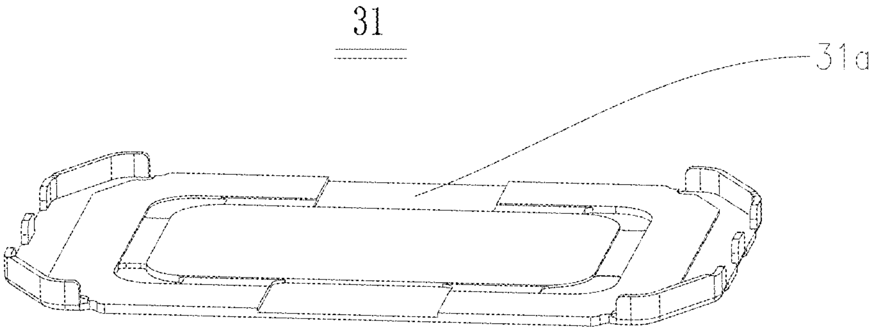
FIG. 5 is an isometric view of a leakage channel provided on a second long side of a lower clamping plate according to another embodiment of the present invention.

As shown in FIGS. 2-3, the leakage channel 31*a* is provided at one of the two first long sides 313. In other embodiments, the leakage channel 31*a* may be provided at one of the two curved corner portions 315 or one of the two second long sides 314 as shown in FIG. 4, the leakage channel 31*a* may be provided at one of the two curved corner portions 315 of the lower clamping plate 31; and as shown in FIG. 5 the leakage channel 31*a* is provided at one of the two second long sides 314 of the lower clamping plate 31.

The magnetic circuit 3 system further includes a main pole plate 321 and an annular secondary pole plate 331 attached to the main magnet 32 and the annular secondary magnet 33 respectively, the elastic support member 22 includes a first portion 221 extending from an inner side of the extension portion 211*b* and a second portion 222 extending from the first portion 221 in a direction away from the extension portion 211*b*, the second portion 222 is fixed with the main body portion 211*a*, the annular secondary pole plate 331 is provided with an avoidance portion 332 to avoid the second portion 222 at a position opposite to the second portion 222.

The speaker further includes a mesh 4 which includes a fixed portion 41 fixed with an edge of the lower clamping plate 31 and a side wall 42 bending and extending from the fixed portion 41 towards the vibration system 2, an end of the side wall 42 is fixed with a lower surface of the frame 1.

Compared with related technology, the leakage channel 31*a* not only effectively balances the sound pressure inside and outside the speaker to improve the acoustic performance of the speaker, but also facilitates the heat dissipation of the voice coil 23.

It may be understood that the above embodiments are only exemplary embodiments adopted to illustrate the principles of the present invention, but the present invention is not limited thereto. For those of ordinary skill in the art, various modifications and improvements can be made without departing from the spirit and essence of the present invention, and these modifications and improvements are also regarded as the protection scope of the present invention.

What is claimed is:

1. A speaker, comprising:

a frame, a mesh, and a vibration system and a magnetic circuit system fixed with the frame, wherein the magnetic circuit system comprises a lower clamping plate, a main magnet fixed with an upper surface of the lower clamping plate, an annular secondary magnet surrounding the main magnet for forming a magnetic gap, the lower clamping plate comprises a lower surface opposite to the upper surface and a leakage channel recessed from the upper surface to the lower surface but not penetrating the lower surface, the leakage channel connects to the magnetic gap and an outside of the annular secondary magnet, the mesh comprises a fixed portion fixed with an edge of the lower clamping plate and a side wall bending and extending from the fixed portion towards the vibration system, an end of the side wall is fixed with a lower surface of the frame.

2. The speaker as described in claim 1, wherein the lower clamping plate comprises two first long sides opposite to each other, two second long sides perpendicular to the two first long sides, and two curved corner portions connecting each of the two first long sides to each of the second long sides, the leakage channel is located in at least one of the two curved corner portions, the two first long sides, the two second long sides.

3. The speaker as described in claim 1, wherein the vibration system comprises a diaphragm fixed with the frame, an elastic support member opposite to the diaphragm, and a voice coil which drives the diaphragm to vibrate to produce sound, the diaphragm comprises a dome and a suspension surrounding the dome, the dome comprises a main body portion and an extension portion bending and extending from an edge of the main body portion towards to the magnetic circuit system, the elastic support member is fixed between the extension portion and the frame, the voice coil is fixed with the main body portion.

4. The speaker as described in claim 3, wherein the suspension comprises a bending portion, an inner fixing portion extending from an inner side of the bending portion, and an outer fixing portion extending from an outer side of the bending portion, the inner fixing portion is fixed with the main body portion, the outer fixing portion is fixed with the frame and provided on three surfaces of the frame.

5. The speaker as described in claim 4, wherein the suspension, the dome, and the frame are integrally formed.

6. The speaker as described in claim 3, wherein the magnetic circuit system further comprises a main pole plate and an annular secondary pole plate attached to the main magnet and the annular secondary magnet respectively, the elastic support member comprises a first portion extending from an inner side of the extension portion and a second portion extending from the first portion in a direction away from the extension portion, the second portion is fixed with the main body portion, the annular secondary pole plate is provided with an avoidance portion to avoid the second portion at a position opposite to the second portion.

* * * * *